US006204343B1

(12) United States Patent
Barucha et al.

(10) Patent No.: US 6,204,343 B1
(45) Date of Patent: Mar. 20, 2001

(54) ROOM TEMPERATURE CURABLE RESIN

(75) Inventors: Dieter Barucha, Hamburg (DE); Dean M. Moren, North St. Paul, MN (US); Manfred Stepputtis, Hamburg (DE); Frank Y. Xu, Austin, TX (US)

(73) Assignee: 3M Innovative Properties Company, St. Paul, MN (US)

( * ) Notice: Subject to any disclaimer, the term of this patent is extended or adjusted under 35 U.S.C. 154(b) by 0 days.

(21) Appl. No.: 09/319,353

(22) PCT Filed: Dec. 11, 1996

(86) PCT No.: PCT/US96/19714

§ 371 Date: Jun. 3, 1999

§ 102(e) Date: Jun. 3, 1999

(87) PCT Pub. No.: WO98/25989

PCT Pub. Date: Jun. 18, 1998

(51) Int. Cl.[7] .................. C08L 61/00; C08F 283/00; C08K 3/10; C08K 3/22; C08K 3/34
(52) U.S. Cl. .................. 525/471; 525/539; 528/220; 524/401; 524/425; 524/443; 524/451; 524/492
(58) Field of Search .................. 525/471, 539; 528/220; 524/401, 425, 443, 451, 492

(56) References Cited

U.S. PATENT DOCUMENTS

| 2,932,385 | 4/1960 | Bollmeier et al. | 206/47 |
| 3,074,544 | 1/1963 | Bollmeier et al. | 206/47 |
| 4,218,515 | 8/1980 | Heckles | 428/474 |
| 4,602,061 | 7/1986 | Akkerman | 525/425 |
| 4,871,822 | 10/1989 | Brindöpke et al. | 526/271 |
| 5,132,367 | 7/1992 | Chan | 525/131 |
| 5,459,178 | 10/1995 | Chan et al. | 523/139 |

FOREIGN PATENT DOCUMENTS

| 4239288 A1 | 3/1994 | (DE) . |
| 0227454 A2 | 7/1987 | (EP) . |
| 04091068 | 3/1992 | (JP) . |
| WO 95/16749 | 6/1995 | (WO) . |

OTHER PUBLICATIONS

R.J. Clemens & F.D.Rector, "A Comparison of Catalysts for Crosslinking Acetoacetylated Resins via the Michael Reaction," *Journal of Coatings Technology*, Mar. 1989, vol. 61, No. 770, pp. 83–91.

F.D.Rector, W.W.Blount & D.R.Leonard, "Applications for Acetoacetyl Chemistry in Thermoset Coatings," *Journal of Coatings Technology*, Apr. 1989, vol. 61, No. 771, pp. 31–37.

T.Li & J.C.Graham, "Use of Formic Acid in Controlling the Rate of the Michael Addition Reaction in Base Catalyzed, Thermally Cured Acetoacetylated Acrylic/TMPTA Coatings," *Journal of Coatings Technology*, Jun. 1993, vol. 65, No. 821, pp. 63–69.

D.L.Trumbo, "Michael Addition Polymers from Bisacetoacetates," *Polymer Bulletin*, (1991), vol. 26, pp. 481–485.

D.L.Trumbo, "Michael Addition Polymers from 1,4 and 1,3 Benzenedimethanol Diacetoacetates and Tripropylene Glycol Diacrylate," *Polymer Bulletin*, (1991), vol. 26, pp. 265–270.

E.S.Gould, *Mechanism and Structure in Organic Chemistry*, pp. 392–395 (1959).

F.D.Rector, & J.S. Witzeman, "Synthesis of Acetoacetylated Resins and Applications for Acetoacetate Chemistry in Thermoset Coatings," *Surface Coatings Australia*, Sep. 1989, pp. 6–15.

*Primary Examiner*—Tae Yoon
(74) *Attorney, Agent, or Firm*—Darla P. Fonseca

(57) ABSTRACT

A curable composition for electrical applications, the curable composition comprising (i) a compound having at least two α,β-unsaturated groups and an equivalent weight of less than 250 g/mol, (ii) a catalyst capable of initiating a Michael reaction and (iii) a Michael donor having an equivalent weight of less than 250 g/mol, and a package for using this composition in electical splices.

7 Claims, No Drawings

ROOM TEMPERATURE CURABLE RESIN

DESCRIPTION

1. Field of the Invention

This invention relates to room temperature curable resin systems that are obtainable by a Michael reaction of a compound having two or more ($\alpha,\beta$-unsaturated groups and a Michael donor in the presence of a suitable catalyst. The obtained cured compositions are suitable for use in electrical applications and in particular for insulation of electrical splices.

2. Background of the Invention

Pourable resins which cure quickly to hard, tough masses have been used for years to protect and insulate electronic parts and electrical cables at points where they have been spliced together. Resins developed for protecting large cable splices have had great demands placed upon them because they are required to function under such adverse conditions. Electrical cables, in particular underground cables, and splices associated with them are routinely exposed to fluctuating temperatures as well as humidity and standing water. The elevated temperatures which the splice must withstand are caused not only by the environment, but also because of the heat generated by the passage of current through the electrical splice. The curable compositions according to the present invention and the splices made using them are suitable for, but not restricted to, low to medium voltage applications, typically those carrying a voltage in the range of up to 10K Volt.

Increasing awareness of environmental issues and pressure from regulatory authorities have made it necessary to develop new resin formulations for this purpose which have a reduced amount of toxic components or are essentially free of materials which are environmental or health hazards. In particular, curable resin systems where the crosslinking mechanism is based on polyurethane chemistry have been used. In such resins, hydroxyl-bearing oligomers such as polyether polyols are crosslinked using low molecular weight polyfunctional isocyanate compounds. Epoxy resins, also commonly used for splices, require the use of stoichiometric amounts of amine-containing hardeners. Replacement of isocyanate-containing and amine-containing systems with less objectionable systems is a long-standing need.

Recently, the use of curable compositions based on a Michael reaction of acetoacetylated resins as a replacement for isocyanate based cross-linking systems has been described as examplified by the publications discussed below. The Michael reaction is a well-known reaction for the formation of carbon-carbon bonds and involves the 1,4-addition of a stabilized carbanion to a $\alpha,\beta$-unsaturated carbonyl compound. This reaction is described in, for example, Mechanism and Structure in Organic Chemistry (E. S. Gould, p. 392–394; Holdt Rinehard and Winston, New York, 1959).

However when replacing the chemistry based on isocyanate cross-linking, it is desirable to have a curing system that meets the requirements generally imposed in electrical applications and in particular in insulation of electrical splice in low (up to 1K Volt) or medium (up to 10K Volt) voltage applications. Such requirements typically include, setting capability at room temperature, appropriate viscosity, good adhesion to cable jacket, high volume resistivity, high electrical resistance, an appropriate pot life, a high hardness and non-foaming behavior in the presence of water, low moisture pickup etc.

U.S. Pat. No. 5,132,367 describes NCO-free resins and cured products thereof. The cured products are obtained by a Michael reaction of an acetoacetylated (meth)acrylic resin or an acetoacetylated polyester and an NCO-free polyurethane having at least two (meth)acrylic end groups. U.S. Pat. No. 5,132,367 however does not teach the use of these products in electrical applications.

EP 227454 discloses a process for preparing a cured polymer involving the Michael reaction of an acetoacetylated polyol and a poly $\alpha,\beta$-unsaturated ester. The obtained cured products are said to exhibit excellent adhesion, excellent solvent resistance, excellent gloss retention, good flexibility and hardness.

U.S. Pat. No. 5,459,178 describes foundry mixtures comprising an acetoacetate ester, an $\alpha,\beta$-ethylenically unsaturated monomer and a liquid tertiary amine catalyst. A cured system is obtained by reacting these components. The acetoacetate ester used is prepared by transesterification of polyhydroxyl compound having an average of at least two hydroxy groups with an alkylacetoacetate.

DE 3508399 corresponding to U.S. Pat. No. 4,871,822 discloses a Michael reaction of olefinically unsaturated compounds with compounds containing at least two active hydrogens for 2 component lacquers. As olefinically unsaturated compounds there are considered compounds having at least two $\alpha,\beta$-unsaturated carbonyl groups. As Michael donors there are considered a large number of compounds amongst which are acetoacetylated polyols or polyamines and such compounds as e.g. acetylacetone or benzoylacetone.

David L. Trumbo in Polymer Bulletin 26, pages 265–270 (1991) discloses Michael addition polymers obtained from 1,4 and 1,3 benzenedimethanol diacetoacetates and tripropylene glycol diacrylate. He further describes that in case the reactants are used in stoichometric amounts of the reactive groups, gelation of the system is observed. In another paper (Polymer Bulletin 26, pages 481–485 (1991)) the same author described Michael addition polymers obtained from the reaction of a bis(acetoacetyl) amide or an aliphatic acetoacetate and a di-acrylate comonomer. However, no utilisation or properties of the polymers are described in these articles.

WO 95/16749 describes a water-borne curable composition that comprises an acetoacetylated polymer in the form of an aqueous solution, dispersion or emulsion and a polyacrylate that has at least two (meth)acrylate end groups. According to this publication, such composition is stable even in the presence of a catalyst until the water is evaporated from the system.

The use of acetoacetyl chemistry, in particular the use of acetoacetylated resin, in thermosetting systems is further described in Journal of Coatings Technology Vol. 61 no. 771 page 31 to 37; Journal of Coatings Technology Vol. 65 no. 821 page 63 to 69; Surface Coatings Australia, September 1989 page 6 to 15; and Journal of Coatings Technology Vol. 61 no. 770 page 83 to 91.

It is now an object of the present invention to provide a pourable, preferably solvent free, room temperature, curable low toxicity composition (isocyanate free) having appropriate electrical properties when cured, in particular insulating characteristics making it suitable for use in electrical applications and in particular for insulation of low- or medium-voltage electrical splices. By room temperature is meant a temperature of about 5° C. to about 30° C., in particular from about 10° C. to about 25° C.

Further objects of the present invention will become clear from the description hereinafter.

SUMMARY OF INVENTION

The present invention provides the use of a curable composition for electrical applications, said curable composition comprising (i) a compound having at least two α,β-unsaturated groups and an equivalent weight of less than 250 g/mol, (ii) a catalyst capable of initiating a Michael reaction and (iii) a Michael donor having an equivalent weight of less than 250 g/mol.

This invention also provides a package containing constituents of a curable composition, said package comprising two compartments, one of said compartments comprising a Michael donor having an equivalent weight of less than 250 g/mol and a compound having at least two α,β-unsaturated groups and an equivalent weight of less than 250 g/mol and the other compartment comprising a catalyst capable of initiating a Michael reaction.

The invention also provides the use of the above package for electrical applications, in particular for insulation of electrical splices.

Further, the present invention provides curable compositions.

DETAILED DESCRIPTION OF THE INVENTION

In accordance with the present invention it was found that a curable composition comprising (i) a compound having at least two α,β-unsaturated groups and an equivalent weight of less than 250 g/mol, (ii) a catalyst capable of initiating a Michael reaction and (iii) a Michael donor having an equivalent weight of less than 250 g/mol can be effectively cured at room temperature to provide cured products that have appropriate electrical properties for use in electrical applications and in particular for insulating electrical splices in low or medium voltage applications.

Equivalent weight in connection with the present invention is defined as the molecular weight of a compound divided by the number of reactivities of the compound that are relevant to the Michael reaction.

Michael donor in connection with the present invention means a nucleophilic reactant, in particular a carbon or nitrogen nucleophilic reactant, in a Michael reaction.

Michael reaction in connection with the present invention means the addition of a nucleophilic reactant to a generally activated α,β-unsaturated group.

The term α,β-unsaturated group means a functional group that is sufficiently activated to act as an acceptor, i.e. an electrophilic group, in a Michael reaction.

In accordance with a particularly preferred embodiment, a curable composition is used for insulating electrical splices, in particular those of the low or medium voltage type. This use generally involves filling a mold body that contains the electrical splice with a curable composition according to the present invention and then allowing it to cure, preferably at ambient temperature. It was found that the cured composition obtained generally has a shore A hardness of more than 60 and very good electrical properties. In particular a high volume resistivity of more than $10^{10}$ Ohm cm (at room temperature) and an electrical resistance of more than 1000 M Ohm could be obtained between two phases of an electrical splice. Further, cured compositions can be obtained that are capable of withstanding fluctuating temperature and humidity conditions to which electrical splices, in particular underground splices, are frequently exposed. Additionally, the curable compositions showed no substantial foaming in the presence of water making it easier to fill a mold body without generation and inclusion of gas bubbles. Such gas bubbles when present tend to decrease the electrical properties of an insulated splice.

The compound has at least two α,β-unsaturated groups, (hereinafter also referred to as α,β-unsaturated compound) preferably two α,β-ethylenically unsaturated groups. Particularly preferred are compounds having at least two and more preferably at least three α,β-unsaturated carbonyl groups. Preferably, such α,β-unsaturated carbonyl groups are acrylic or methacrylic groups. It was further found that improved electrical properties in the cured system are obtained when the molecular weight of the α,β-unsaturated compound decreases and the reactive functionality increases. Generally, very good electrical properties are obtained when low molecular weight and high functionality α,β-unsaturated compounds, i.e., low equivalent weight, are reacted with a high functionality, low molecular weight Michael donor. The drawback of this is however that the shrinkage of the system may become unacceptable and additional exotherm may soften/melt polyolefin cable jacket. An appropriate selection of the reactants therefore needs to be made.

Furthermore, in using the composition for making splices, curing of the composition is preferably carried out at ambient temperature. Curing in a system involving low molecular weight and highly functional reactants at ambient temperature generally leaves a large number of reactive groups unreacted. This in turn causes the curing reaction to continue especially in the vicinity of the cables since electrical current flowing through the cables causes some increase in temperature. As a consequence, the splice will have a higher cross-linking density at the vicinity of the cables and lower near the outer region of the mold. Fluctuating environmental conditions such as temperature and humidity may thus cause mechanical stresses in the splice causing cracking at boundaries of completely cross-linked regions and less cross-linked regions. It may therefore be desirable to reduce the functionality in a composition that is intended for curing at ambient temperature so as to introduce more linearity in the cured product. It should be noted however that the above crack formation also depends on such factors as the size of the mold, kind of splice and adhesion of the composition to the sidewalls of the mold and therefore will not always be observed. Nevertheless, it is desirable to have a curable composition that can be used under the most broad variety of conditions without showing crack formations.

To obtain good electrical and mechanical properties the equivalent weight of an α,β-unsaturated (carbonyl) compound in connection with this invention is less than 250 g/mol and more preferably less than 200 g/mol. A particularly preferred range of equivalent weight is between 30 g/mol and 150 g/mol.

Examples of suitable α,β-unsaturated compounds are α,β-unsaturated ketones, α,β-unsaturated esters, α,β-unsaturated aldehydes, α,β-unsaturated amides, α,β-unsaturated carboxylic acids, α,β-unsaturated nitriles, α,β-unsaturated sulfoxides, (α,β-unsaturated sulfones, α,β-unsaturated nitro compounds, α,β-unsaturated phosphonates, α,β-unsaturated phosphoranes and the like, in particular 1,6-hexanediol diacrylate, tetraethylene glycol diacrylate, tetraethylene glycol dimethacrylate, trimethylolpropane triacrylate, trimethylolpropane trimethacrylate, ditrimethylolpropane-tetraacrylate, ditrimethylolpropane-tetramethacrylate, pentaerythritol tetraacrylate, pentaerythritol tetramethacrylate and the like. In accordance with the present invention, a curable composition can additionally contain mono α,β-unsaturated compounds such as e.g. a monoacrylate.

A suitable catalyst for the Michael reaction is a base of which the conjugated acid preferably has a p$K_a$ between 12 and 14. Most preferably used bases are organic. Examples of such bases are 1,4-dihydropyridines, methyl diphenylphosphane, methyl di-p-tolylphosphane, 2-allyl-N-alkyl imidazolines, tetra-t-butylammonium hydroxide, 1,8-diaza-[5.4.0]-bicycloundecene, potassium methoxide, sodium hydroxide, and the like. A highly preferred catalyst in connection with this invention is tetramethylguanidine. The amount of catalyst used in a curable composition in accordance with the present invention is preferably between 0.05% by weight and 2% by weight more preferably between 0.1% by weight and 0.6% by weight.

A Michael donor in connection with the present invention preferably corresponds to one of formulas (I) to (III):

$(W^1-CHR^1-W^2)_x-P$          (I)

$(W^1-NH-W^2)_x-P$          (II)

$W^1-CH_2-W^2$          (III)

wherein $R^1$ represents hydrogen, an alkyl group or an aryl group;

$W^1$ and $W^2$ each independently represents an electron withdrawing group such as e.g. a cyano group, a nitro group, an alkyl carbonyl group, an alkoxy carbonyl group, an aryl carbonyl group, an aryloxy carbonyl group, an amido group, a sulphonyl group and the like;

P represents a multi-valent organic residue such as e.g. a hydrocarbon group or the reaction residue of a polyol or polyamine in an acetoacetylation reaction and x represents an integer of 2 or more.

Particularly preferred Michael donors according to formula (I) are acetoacetylated polyols. The acetoacetylated polyol can be prepared by transesterification with an alkyl acetoacetate. A preferred transesterification reagent for this purpose is tertiarybutyl acetoacetate described by J. S. Witzeman and W. D. Nottingham of Eastman Kodak Company at Chemspec USA 89 Symposium. The polyols being acetoacetylated in this invention preferably have 2 or more hydroxy groups. The conversion of hydroxy groups to acetoacetate groups should be between 80 mol % and 100 mol % and more preferably between 85 mol % and 100 %. Suitable acetoacetylated polyols are for examples those obtained from one of the following polyols: pentaerythritol, trimethylolethane, trimethylol propane, ditrimethylol propane, K 55 available from Bayer AG which is a condensation product of trimethylolpropane and propyleneoxide, dipentaerythritol, castor oil, glycerine, dipropyleneglycole, N,N,N',N'-tetrakis(2-hydroxypropyl)ethylendiamine, neopentylglycole, propanediol, butanediol, diethyleneglycole and the like. It was further found that lower functionalised acetoacetylated polyols allow a more selective and better control of cross-linking than higher functionalised acetoacetylated polyols. Preferably, an acetoacetylated polyol in connection with this invention has an equivalent weight of less than 200 g/mol. A preferred range of equivalent weight of an acetoacetylated polyol in connection with this invention is between 30 g/mol and 150 g/mol.

Examples of Michael donors according to formula (II) are e.g. compounds of the type p.$CH_3-(C_6H_4)-SO_2NHCOO-G$ wherein G represents the residue of a polyol such as e.g. pentaerythritol, trimethylolpropane, 1,6-hexanediol, ditrimethylolpropane, propanediol, diethyleneglycole and the like.

Examples of compounds according to formula (III) are $NC-CH_2-CN$, $CH_3SO_2CH_2CN$, $CF_3-CO-CH_2-CO-CF_3$, $CF_3-CO-CH_2-CO-OC_2H_5$, p—$CH_3C_6H_4SO_2CH_2SO_2CH_3$, $C_6H_5-CO-CH_2-SO_2CH_3$, $(CH_3O_2CCH_2)_2SO_2$, p—$O_2NC_6H_4CH_2CN$, and the like. Further examples may be found in U.S. Pat. No. 5,256,473. A particularly preferred type of Michael donor corresponding to formula (III) for use in this invention corresponds to the following formula (IV):

$R-CO-CH_2-CO-R'$          (IV)

wherein R and R' each independently represent an aryloxy group, an alkoxy group, an alkyl group or an aryl group.

A Michael donor according to formula (III) and in particular formula (IV) is being preferred because they are generally less costly than e.g. an acetoacetylated polyol which requires an acetoacetylation of a polyol as described above. Moreover, this acetoacetylation involves a transesterification during which an alcohol is formed as a waste.

It has further been found that in particular compounds according to formula (IV) can yield cured compositions at ambient temperature with excellent electrical properties that can even out-perform those of the isocyanate based systems. Also, the obtained cured compositions are capable of withstanding substantial fluctuations in temperature and humidity without a need for additional components such as e.g. a filler. Preferred Michael donors according to formula (IV) are those wherein R and R' are independently selected from a substituted or an unsubstituted alkyl such as e.g. methyl, ethyl, propyl, an unsubstituted or substituted aryl such as e.g. a phenyl, a substituted or unsubstituted alkoxy group such as e.g. a methoxy, an ethoxy, a t-butoxy or a substituted or unsubstituted aryloxy group such as e.g. a phenoxy group. Examples of compounds according to formula (IV) are acetylacetone, methylacetoacetate, ethylacetoacetate, methyl malonate, ethyl malonate, t-butyl acetoacetate, and the like.

In connection with the present invention it is preferred to use Michael donor and α,β-unsaturated compound in stoichiometric amounts. It is, however, possible to deviate from the stoichiometric amounts and a practical working ratio of Michael donor to α,β-unsaturated compound is between 1 and 1.5.

A curable composition in connection with the present invention may include further components such as a filler and/or a thickener. The use of a filler has the advantage that the total cost of the composition can be reduced without substantially reducing the properties and in particular the electrical properties of the cured polymer obtained from the composition. The amount of filler may vary over a wide range but is preferably between 10 and 75% by weight and more preferably between 15 and 65% by weight. It has further been found that crack formation in electrical splices under fluctuating temperature and humidity conditions that is sometimes observed with a cured product obtained from a composition that comprises high functionality and low molecular weight reactants e.g. with an acetoacetylated polyol in accordance with this invention can be avoided when the composition includes at least 50% by weight of filler.

Suitable fillers that can be used in connection with the present invention include organic and/or inorganic fillers such as feldspar, silica, glass bubbles, sand, talc, aluminium hydroxide, thermoplastic powders, caoline, silicium dioxide, aluminium silicates, magnesium silicates, particulate polymeric fillers, glass beads and glass microbubbles, ceramic particles, magnesium carbonate calcium carbonate, and the like.

It is further desirable to add a thickener to the composition so as to obtain a viscosity between 1000 and 5000 centipoise. If the composition has too low a viscosity, it may leak from a mold and special precautions to avoid such leaking would then be needed. On the other hand, if the viscosity becomes too high, it may be difficult to fill a mold without the inclusion of air bubbles. Suitable thickeners for use in a composition in connection with this invention are preferably compatible with the composition and include for example solid ketone-resins, solid urea resins, solid formaldehyde resins and solid epoxy resins. An adhesion promoting agent is optionally present to insure good adhesion of the resin matrix to the embedded electrical splice. Even though a wide variety of adhesion-promoting agents can be used for this purpose, organosilanes such as vinyltrimethoxysilane, vinyltriethoxysilane and aminopropyltriethoxysilane have been found to be particularly effective. Particularly preferred is aminopropyltriethoxysilane (Silquest™A1100 available from Osi Specialties). The adhesion promoting agent can be added to the composition in amounts of 0.3 to 4.0 weight percent, preferred is about 1 to about 3, with 1% being most preferred.

Optionally, the composition may also contain a plasticizer. Plasticizers that can be used in the present invention are for example hydrocarbon resins, phthalates, e.g. dialkyl phthalates, polybutenes, liquid paraffins, vegetable oils, naphthenic acids, adipates, glutarates, benzoates, etc. A preferred plasticizer is dioctyl adipate.

Curable compositions in connection with the present invention are preferably substantially free of solvents and readily pourable at ambient temperature in particular when the application is intended for insulation of electrical splices.

Curable compositions in connection with the present invention generally have a pot life between 10 and 60 minutes so that there is sufficient handling time of the composition once it has been prepared. Preferably, a curable composition in connection with the present invention is prepared by mixing two parts together. One part contains the catalyst and the other contains the reactants, i.e. the $\alpha,\beta$-unsaturated compound and the Michael donor. Although it is also possible to have the catalyst together with one of the reactants in one part and having the other reactant in the other part, these embodiments generally produce inferior results, presumably because reaction of the catalyst with the reactant can take place. The extent of this reaction will generally depend on the kind of catalyst and reactants used.

In accordance with a preferred embodiment in connection with the present invention, a package is provided containing the constituents of a curable composition, the package comprising two compartments, one of the compartments comprising a Michael donor according to this invention and a compound having at least two $\alpha,\beta$-unsaturated (carbonyl) groups. The other compartment comprises a suitable catalyst for the Michael reaction. It is further preferred to have a thickener added to this latter compartment. Further, a filler may be added to the compartment containing the catalyst and/or the filler may be added to the compartment holding the reactants.

A preferred type of package for use in this invention is disclosed in U.S. Pat. No. 2,932,385 or U.S. Pat. No. 3,074,544. Thus, U.S. Pat. No. 3,074,544 discloses a multiple compartment flexible unitary package for compartmentalised accommodation and selective admixture of at least two fluent materials, comprising a normally flat envelope of strong flexible heat sealable sheet material, two opposing sidewalls of said envelope being joined by heat sealing to form a transversely extending rupturable seam separating the interior of said envelope into individual compartments, the seam including masking means in the form of a substantially uniformly open web interposed between sidewalls and through the openings of which the sidewalls are heat sealed, said web reducing to substantially less than its total area, the area of the seam over which joinder of the sidewalls is effected.

A further suitable package for use in connection with this invention is described in for example DE-A 4239288. It comprises a surrounding bag with two portion bags therein. The contents of these portion bags is kept separate by a clamp. By removing the clamp, the contents can be mixed together in the surrounding bag. A good mixing can be obtained by kneading the surrounding bag and contact with the chemicals is avoided. After mixing, the surrounding bag can be opened and the ready composition can then be used. Accordingly, the use of a package in accordance with the present invention involves mixing the contents of the compartments together and subsequently using the resulting composition in an electrical application as set out above.

In accordance with the present invention, a curable composition can be poured in a mold containing an electrical splice. Subsequently, the curable composition is allowed to cure in the mold so as to obtain in insulated electrical splice.

The invention will now be illustrated by way of the following examples without however the intention to limit the invention thereto.

EXAMPLES

The following test methods are used in the examples:

Volume Resistivity (rho)

This test is based on standard method DIN IEC 93 or VDE 0303 (Part 30). Resin was cast into a siliconized mold to make a thin sheet of the test resin. The resin was cured for 24 hours at a temperature of 23 ° C., followed by 24 hours at 80 ° C. The sample was 3 mm thick and had a surface area sufficient to cover the head of the electrode. The 3 mm sheet was placed between two electrodes and a voltage of 500 volts applied. A reading of absolute resistance, R, was recorded in Mohms after 60 seconds. Rho, the volume resitivity, was then calculated using the following formula: R=rho (L/A). L/A is known exactly from the electrode configuration. Rho was then recorded in units of Ohm x cm.

Dielectric Strength (minimum of 6 kV/mm: our range 10–50 kV)

The dielectric strength of the resin was measured according to the standard test method VDE 0303 (Part 2/11.74). The thickness of the resin sample was 1 mm. Measurements were made using an AC Dielectric Breakdown Tester, available commercially from Beckman Industrial (USA). The rate of rise of voltage was 500 volts per second. Breakdown voltage is automatically recorded by the instrument. Results were recorded in kV/mm.

Dielectric Properties

General dielectric properties of the materials were measured using a modified version of the standard test method VDE 0303 (Part 4/12.69). Instead of using a Schering bridge as described by the method, measurements were made using a CAPAMAT Model 2700 Loss Factor Measurement System (Burster Praezisionsmesstechnik, Gernsbach, Germany). The CAPAMAT 2700 was used in conjunction with a solid sample test cell Model 2914, available commercially from TETTEX, Zurich, Switzerland. This equipment has the advantage that the sample and comparison material are not connected in series as with a Schering bridge, but rather that each has its own circuit.

Samples were in the form of 1 mm thick sheet of sufficient dimension to cover the electrode surface. Resin samples were cured at 23° C. for 24 hours, followed by 24 hours at 80° C. before measurements were made.

Both permittivity (or K factor) and loss factor were calculated based on measurements made at three temperatures.

Longitudinal Water Tightness (LWT hereinafter) (VDE 0278, Part 3)

This is a functional test for the determination of the long term ability of the cured composition to maintain its insulating function in the presence of water and under the influence of fluctuating temperature. The test method is described in detail in VDE 0278, Part 3 (Verband Deutscher Elektrotechniker).

First, a low-voltage in-line splice is prepared. Four separate wires have a cross-section of 150 sq. mm are spliced using standard methods. The splice is then covered with a large two-part polymeric mold body having a length of approximately 500 mm and a circumference at its largest part of about 350 mm.

Approximately four kilograms of curable composition was prepared as described in the examples and poured into the mold body, thus encapsulating the splice in resin.

The completed low-voltage in-line splice, denoted hereinafter as a loop, was subjected to a variety of conditions designed to simulate long term environmental exposure. Electrical resistance was measured after the tests. A large amount of data is generated from these tests, including several different phase-to-phase measurements and phase-to-water measurements. An average value describing the overall electrical resistance is given. This should be considered as a relative measurement used for comparative purposes only.

The tests were:

A) immersion in water at 23° C. for 24 hours

B) 63 thermocycles in air, where one thermocycle comprises 5 hours at elevated temperature followed by 3 hours of cooling to ambient temperature.

Before running the thermocycles in water, the insulation resistance phase-to-phase and phase-to-water is measured.

C) 63 thermocycles in water where one thermocycle comprises 5 hours at elevated temperature followed by 3 hours of cooling to ambient temperature.

Temperatures during the thermocycle tests were:

95° C. directly at the conductor

70° C. at the conductor outside the mold

50–60° C. at the outer shell of the mold.

The heat necessary for the thermocycles was generated by passing a high current of low voltage through four loops connected in series as described in the standard method.

Viscosity of the Curable Composition

Viscosity of the curable composition was measured by cone and plate geometry viscometry using a Model CV 20 N Viscometer manufactured by Haake (Karlsruhe, Germany) with a Pk 45–4° cone. Results were recorded in units of milliPascal seconds (nPs).

Shore A Hardness

After the curable composition was cured at room temperature, the Shore A Hardness was measured using a German industry standard test method (DIN 53505).

List of Chemical Components used in the Examples

Ditrimethylolpropane tetraacrylate (SR 355™ available from Cray Valley)

tetramethyl guanidine (TMG)

glass bubbles filled with inert gas (Armospheres CN™ available from Langer & Co)

K55™ (available from Bayer AG; condensation product of trimethylolpropane and propylene oxide M=450 g/mol)

acetoacetylated product of K55™(K55(AcAc)$_3$)

Acetoacetylated pentaerythritol (Pentaerythrit (AcAc)$_4$)

Laropal™ A 81 (cyclohexanone condensation product supplied by BASF)

tertiarybutylacetoacetate (TBAA)

Microdol™ (dolomite particles supplied by Norwegian Talc)

Thixin™-Paste (caster oil derivative supplied by Rheox)

Baylith™ (zeolite supplied by Bayer AG)

Epodil™ L (condensation product of toluene and formaldehyde supplied by Anchor Chemicals)

Ebecryl™ (obtained from UCB)

Acetoacetylated polyols were prepared according to the following general procedure:

The selected polyol and the acetoacetylating compound (TBAA was used), also called transesterification reagent, were added to a reaction kettle equipped with a stirrer and a distillation column connected to a vacuum line. Amounts of polyol and transesterification reagent were selected in accordance with a desired conversion degree of the polyol with 85 mol% being obtained when the polyol and transesterification reagent were used in stoichiometric amounts. A 100 mol% conversion was obtained using the transesterification reagent in a molar excess of ⅓. The relationship between conversion and amounts of reactants was determined by qualitative IR-spectroscopy and quantitative analysis of the alcohol that is released during the reaction.

The reaction was carried out at 150° C. for 1 hour and during the next two hours the temperature was raised stepwise to 170° C. The reaction was continued at this temperature until no more alcohol released. The receiver was then removed and a vacuum was applied to remove any residual alcohol which was trapped in a carbondioxide ice bath. The combined quantities of destined and trapped alcohol yield the total amount of released alcohol.

Example I

This example shows the effect of the equivalent weight of the acetoacetylated polyol on the properties of the obtained cured composition (conversion degree of the acetoacetylated polyols was 85 mol% in each of the compositions). The following curable compositions were prepared and allowed to cure at ambient temperature for 24 hours and subsequently at 80° C. for 24 hours. All parts listed are by weight. The mechanical and electrical properties of the cured compositions were subsequently determined using the above test methods.

Composition 1-A:

| | |
|---|---|
| Pentaerythrit (AcAc)$_4$ (equivalent weight 59 g/mol) | 34 parts |
| SR 355 | 66 parts |
| TMG | 0.5 parts |

Composition 1-B:

| | |
|---|---|
| K55 (AcAc)$_3$ (equivalent weight 116 g/mol) | 50 parts |
| SR 355 | 50 parts |
| TMG | 0.3 parts |

Composition 1-C:

| | |
|---|---|
| PPG 1000 (AcAc)$_2$ (equivalent weight 292 g/mol) | 72 parts |
| SR 355 | 28 parts |
| TMG | 0.3 parts |

Composition 1-D:

Commercially available composition SCOTCHCAST® (3M Company) based on isocyanate crosslinking.

TABLE 1

Mechanical and Electrical Properties

| | 1-A | 1-B | 1-C | 1-D |
|---|---|---|---|---|
| Tensile strength (N/mm$^2$) | 18 | 16 | 0.6 | 15 |
| Elongation at break (%) | 2 | 15 | 32 | 75 |
| Dielectric Strength (kV/mm) | 28 | 28 | 23 | 24 |
| Loss Factor | | | | |
| room temperature | 0.009 | 0.03 | 0.13 | 0.05 |
| 50° C. | 0.009 | 0.14 | 0.46 | 0.08 |
| 80° C. | 0.01 | 0.18 | 0.68 | 0.13 |
| Permittivity | | | | |
| room temperature | 4.1 | 4.4 | 7.2 | 4.6 |
| 50° C. | 4.3 | 7.2 | 11.2 | 5.8 |
| 80° C. | 4.4 | 9.4 | 18.0 | 7.2 |

The above table shows that in case the equivalent weight of the acetoacetylated polyol becomes more than 250 g/mol (composition 1-C), the obtained results are unsatisfactory, in particular the mechanical and electrical properties are unacceptable. On the other hand in case of an acetoacetylated polyol with an equivalent weight below 250 g/mol, the properties of the cured composition are approximately equal to that of an isocyanate containing system (1-D) and in some cases are even better. In particular, little dependence of the loss factor and permittivity is seen for composition 1-A.

Example 2

This example shows the influence of the equivalent weight of the α,β-unsaturated compound on the properties of the cured composition. Curable compositions shown below were prepared and cured in accordance with the procedure of example 1 (conversion degree of the polyols was 85 mol%).

Composition 2-A

| | |
|---|---|
| Pentaerythrit (AcAc)$_4$ | 34 parts |
| SR 355 (equivalent weight 116 g/mol) | 66 parts |
| TMG | 0.5 parts |

Composition 2-B

| | |
|---|---|
| Pentaerythrit (AcAc)$_4$ | 19 parts |
| Ebecryl ™ 80 (equivalent weight 250 g/mol) | 81 parts |
| TMG | 0.7 parts |

TABLE 2

Mechanical and Electrical Properties

| | 2-A | 2-B |
|---|---|---|
| Tensile Strength (N/mm$^2$) | 18 | 3 |
| Elongation at break (%) | 2 | 20 |
| Dielectric Strength (kV/mm) | 28 | 20 |
| Loss factor | | |
| room temperature | 0.009 | 0.16 |
| 50° C. | 0.009 | 0.75 |
| 80° C. | 0.01 | 0.58 |
| Permittivity | | |
| room temperature | 4.1 | 9 |
| 50° C. | 4.3 | 12.4 |
| 80° C. | 4.4 | 20.9 |

The above table shows that the mechanical and electrical properties of the cured system are unacceptable when the equivalent weight of the α,β-unsaturated compound increases to 250 g/mol.

Example 3

This example shows the influence of the conversion degree of the polyol and the influence of the relative amounts of the reactants. Cured compositions were prepared in accordance with the procedure set out in example I using the curable compositions shown in the following Table 3A. Table 3B shows the mechanical properties of the cured compositions.

TABLE 3A

| | Conversion degree | Compositions Composition Number | | | | | |
|---|---|---|---|---|---|---|---|
| Ingredient | (mol %) | 3-A | 3-B | 3-C | 3-D | 3-E | 3-F |
| K55(AcAc)$_3$ | 100 | 50 | — | — | 57 | — | — |
| K55(AcAc)$_3$ | 85 | — | 50 | — | — | 57 | — |
| K55(AcAc)$_3$ | 70 | — | — | 50 | — | — | 57 |
| SR 355 | — | 50 | 50 | 50 | 43 | 43 | 43 |
| TMG | — | 0.3 | 0.3 | 0.3 | 0.3 | 0.3 | 0.3 |

TABLE 3B

Mechanical Properties

| Property | 3-A | 3-B | 3-C | 3-D | 3-E | 3-F |
|---|---|---|---|---|---|---|
| Tensile strength (N/mm$^2$) | 39 | 16 | 1 | 10 | 13 | 2 |
| elongation (%) | 3 | 15 | 18 | 31 | 23 | 25 |

From Table 3B it can be seen that the mechanical properties are bad in case the degree of conversion of the acetoacetylated polyol is too low (3-C and 3-F) and that the mechanical properties are generally better in case stoichiometric amounts of the reactants are used in the Michael reaction.

Example 4

This example shows the influence of filler on a curable composition containing an acetoacetylated polyol. Curable compositions were prepared as shown below. These compositions were then cured in accordance with the procedure set out in example 1.

Composition:

| | |
|---|---|
| K55 (AcAc)$_3$ (equivalent weight 116 g/mol) | 57 parts |
| SR 355 | 43 parts |
| TMG | 0.3 parts |
| Microdiol ™ | (see Table 4) |

TABLE 4

| Sample No. | Amount of filler[1] (% by weight) | Tensile strength (N/mm$^2$) | Elongation at break (%) |
|---|---|---|---|
| 4-A | 10 | 6.68 | 28.70 |
| 4-B | 20 | 9.20 | 26.70 |
| 4-C | 30 | 8.25 | 25.41 |
| 4-D | 40 | 7.94 | 19.11 |
| 4-E | 50 | 8.19 | 15.04 |

[1]Amount of filler is expressed as a percent by weight of the total composition Electrical splices were prepared using curable compositions 4-A to 4-E. The curable compositions were allowed to cure at ambient temperature for 24 hours and were subsequently tested in accordance with the LWT test described above. It was observed that samples 4-A to 4-D showed formation of cracks in the splice after about 25 to 30 thermocycles in air. These cracks were not observed in case of sample 4-E.

Example 5

This example shows the results obtained with a curable composition containing a compound according to formula (IV). A curable composition was prepared by mixing 100 parts A with 22 parts B. The obtained curable composition after 3 minutes of mixing had a viscosity of 2600 mPs and was subsequently cured in accordance with the procedure of example 1.

| PART A: | |
|---|---|
| TBAA | 13.7 parts |
| SR355 | 13.2 parts |
| Microdiol ™ | 62.6 parts |
| Thixin ™ Paste | 7.5 parts |
| Baylith ™ | 3.0 parts |
| PART B: | |
| Laropal ™ A 81 | 44 parts |
| Epodil ™ L | 53 parts |
| TMG | 3 parts |

TABLE 5

Mechanical and Electrical Properties

| | |
|---|---|
| Tensile strength (N/mm$^2$) | 5.4 |
| Elongation at break (%) | 0.7 |
| Shore A hardness | 62 |
| Dielectric Strength (kV/mm) | 22 |
| Loss factor | |
| Room temperature | 0.01 |
| 50° C. | 0.12 |
| 80° C. | 0.55 |
| Permittivity | |
| Romm temperature | 4.2 |
| 50° C. | 6.6 |
| 80° C. | 10.2 |

The curable composition was also used to insulate an electrical splice in accordance with the procedure described in example 4. No formation of cracks was observed in the LWT test. Similar compositions with lower amounts of filler upto 20parts by weight were also tested and did not show formations of cracks in the LWT test. It was further found that the insulation resistance (phase-to-phase and phase-to-water) obtained in the LWT test was more than 10000 Mega Ohms and comparable to commercial insulation resins.

What is claimed is:

1. A curable composition comprising
   (i) a compound having at least two α,β-unsaturated groups and an equivalent weight of less than 250 g/mol,
   (ii) a catalyst capable of initiating a Michael reaction,
   (iii) a Michael donor having an equivalent weight of less than 250 g/mol, and
   (iv) from about 10 to about 65% by weight of a filler selected from the group consisting of feldspar, silica glass bubbles, sand, talc, aluminum hydroxide, thermoplastic powders, caoline, silicium dioxide, aluminum silicates, magnesium silicates, particulate polymeric fillers, ceramic particles, magnesium carbonate and calcium carbonate.

2. A curable composition according to claim 1 wherein said Michael donor is an acetoacetylated polyol having a conversion degree of at least 80 mol% and said two α,β-unsaturated groups are two α,β-unsaturated carbonyl groups.

3. A curable composition according to claim 2 comprising at least about 50% by weight filler.

4. A curable composition according to claim 1 comprising
   (i) a compound having at least three α,β-unsaturated groups and an equivalent weight of less than 250 g/mol,
   (ii) a catalyst capable of initiating a Michael reaction, and
   (iii) a Michael donor having an equivalent weight of less than 250 g/mol and corresponding to the formula:

$$W^1-CH_2-W^2$$

wherein $W^1$ and $W^2$ each independently represents an electron withdrawing group.

5. A curable composition according to claim 4 wherein said three α,β-unsaturated groups are α,β-unsaturated carbonyl groups and said Michael donor corresponds to the following formula (IV):

$$R-CO-CH_2-CO-R' \quad (IV)$$

wherein R and R' each independently represent an aryloxy group, an alkoxy group, an alkyl group or an aryl group.

6. A curable composition according to claim 5 wherein said α,β-unsaturated carbonyl groups are acrylic or methacrylic groups or a mixture thereof.

7. A cured polymer obtainable by curing a curable composition as defined in claim 4.

* * * * *